Aug. 5, 1958 J. M. CLUWEN 2,846,652

TRANSISTOR MODULATOR

Filed April 24, 1956

INVENTOR
JOHANNES MEYER CLUWEN

BY Fred M. Vogel
AGENT

United States Patent Office 2,846,652

Patented Aug. 5, 1958

2,846,652

TRANSISTOR MODULATOR

Johannes Meyer Cluwen, Eindhoven, Netherlands, assignor, by mesne assignments, to North American Philips Company, Inc., New York, N. Y., a corporation of Delaware Application April 24, 1956, Serial No. 580,355

Claims priority, application Netherlands May 2, 1955

9 Claims. (Cl. 332—52)

The present invention relates to transistor modulator circuit arrangements. More particularly, the invention relates to transistor modulator circuit arrangements comprising at least two transistors and two signal sources coupled thereto. In modulators of this type, momentary short-circuits of a signal source connected to the collector may occur due to collector-base rectification of the transistors. This may cause considerable losses and sometimes cause unduly heavy currents to flow through the transistors.

These difficulties may be avoided by the insertion, in series with the collector-base paths of the transistors, of rectifiers having opposite pass-directions. An object of the present invention is the provision of a simple solution of the problem which dispenses with said rectifiers. In accordance with the present invention, the collector-base path of one transistor is connected in series with the emitter-collector path of the other transistor and conversely. The electrical admittance of the emitter-collector paths is controlled by one signal source. The other signal source is connected between the collector electrodes of the transistors. This permits transient short-circuits of the signal source connected between the collectors to be avoided.

In order that the invention may be readily carried into effect, it will now be described in detail with reference to the accompanying drawing, in which.

Figure 1:
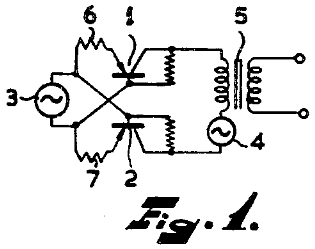
Fig. 1 is a schematic diagram of an embodiment of the transistor modulator circuit arrangement of the present invention.

In Fig. 1, the modulator comprises two transistors 1, 2 and two signal sources 3, 4. One terminal of the source 3 is connected to the emitter electrode of transistor 1 and to the base electrode of transistor 2, while its other terminal is connected to the emitter electrode of transistor 2 and to the base electrode of transistor 1. The source 4 is connected in series with an output transformer 5 between the collector electrodes of the transistors 1 and 2. If desired, the sources 3 and 4 may be coupled to the circuit by transformers.

In the phase in which the upper terminal of source 3 is positive and its lower terminal is negative, the transistor 1 is conductive and the transistor 2 is non-conductive. If the source 4 is in the same phase as source 3, in which its upper terminal is negative and its lower terminal is positive, current will flow from the source 4 via the collector-base path of the transistor 2, which path is driven in its forward direction, and subsequently via the emitter-collector path of the transistor 1 to the output transformer 5. The value of this current is determined primarily by the degree to which current is passed from the emitter to the collector of the transistor 1, which depends upon the instantaneous value of the signal of the source 3. Hence, unduly heavy currents are easily avoided. A part of the current will flow through the source 3 since, with the signal phases as postulated, the emitter and the collector of the transistor 2 will change their functions. If, however, transistor 2 is of the non-symmetrical type, and consequently has a low current-amplification factor in the opposite direction, and/or the voltage of the source 3 is relatively low in magnitude, the current may remain sufficiently small.

Figure 2:
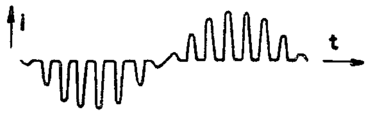
Fig. 2 is a graphical presentation of output current versus time for the embodiment of Fig. 1.

During the opposite phase of the signals of the sources 3 and 4, current passes in the opposite direction through the transformer 5. Hence, the output current *i* varies as a function of the time *t* as shown in Fig. 2. If the source 3 provides a modulating signal of relatively small magnitude and the source 4 provides a carrier oscillation of relatively large magnitude, the modulated signal produced will be amplified relative to the modulating signal, but in general will not vary linearly with the modulating signal. However, the linearity may then be considerably improved by connecting resistors 6 and 7, which may be decoupled with respect to the carrier frequency, in the emitter leads of the transistors, and/or by connecting the collector electrodes of the transistors through relatively high resistors to their base electrodes. If, on the other hand, the source 3 provides a slightly stronger carrier oscillation, and the source 4 provides a modulation signal of relatively small magnitude, a non-amplified but practically linearly modulated signal will be produced.

As may be seen from the curve of Fig. 2, a low-frequency alternating current flows through the source 4 and the transformer 5, which may be objectionable, if the source 4 provides the carrier oscillation. The objectionable current flow, may however, be avoided by a double push-pull arrangement, as shown in Fig. 3.

Figure 3:
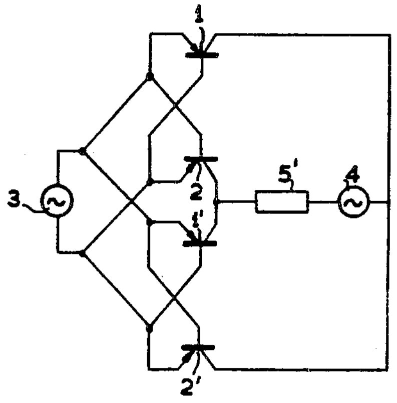
Fig. 3 is a schematic diagram of a modification of the embodiment of Fig. 1.

In Fig. 3, the signal to be modulated from the source 3 is supplied to the emitter electrodes of two pairs of transistors 1, 2 and 1', 2', while the source 4 of carrier-oscillations is connected in series with an output impedance 5' between the interconnected collector electrodes of the transistors 1, 2' and 1', 2.

The output transformer 5 and the impedance 5' respectively may be selective with respect to the modulated oscillations produced by the circuit. Alternatively, the output transformer 5 may pass on the low frequency and/or direct current component of the output current *i* (Fig. 2) to the output circuit. If the two sources 3 and 4 supply signals of the same frequency, an alternating current having an amplitude dependent upon the relative phase-difference of the signals will be produced. This effect may be utilized in circuit-arrangements for phase or frequency detection or for controlling the correct phase of a signal oscillation.

It is to be understood that the invention is not limited to the details disclosed but includes all such variations and modifications as fall within the spirit of the invention and the scope of the appended claims.

What is claimed is:

1. A modulator circuit arrangement comprising a pair of transistors, each having an emitter electrode, an collector electrode, a base electrode, an emitter-collector path and a collector-base path, means for connecting the emitter-collector path of one of said transistors in series with the collector-base path of the other of said transistors, means for connecting the collector-base path of said one transistor in series with the emitter-collector path of said other transistor, means for controlling the electrical admittance of said emitter-collector paths comprising a first signal source connected between the emitter and base electrodes of said transistors, a second signal source, means for deriving an output signal connected in series circuit arrangement with said second signal source, and means for coupling said collector electrodes comprising said series circuit arrangement.

2. A modulator circuit arrangement comprising a pair of transistor each having an emitter electrcode, a collector electrode, a base electrode, an emitter-collector path and a collector-base path, means for connecting the emitter-collector path of one of said transistors in series with the collector-base path of the other of said transistors including means for connecting the emitter electrode of said one transistor to the base electrode of said other transistor, means for connecting the collector-base path of said one transistor in series with the emitter-collector path of said other transistor including means for connecting the base electrode of said one transistor to the emitter electrode of said other transistor, a first signal source connected between said base electrodes, a second signal source, means for deriving an output signal connected in series circuit arrangement with said second signal source, and means for coupling said collector electrodes comprising said series circuit arrangement.

3. A modulator circuit arrangement comprising a pair of transistors each having an emitter electrode, a collector electrode, a base electrode, an emitter-collector path and a collector-base path, means for connecting the emitter-collector path of one of said transistors in series with the collector-base path of the other of said transistors including means for connecting the emitter electrode of said one transistor to the base electrode of said other transistor, said last-mentioned means comprising a resistor connected to the emitter electrode of said one transistor, means for connecting the collector-base path of said one transistor in series with the emitter-collector path of said other transistor including means for connecting the base electrode of said one transistor to the emitter electrode of said other transistor, said last-mentioned means comprising a resistor connected to the emitter electrode of said other transistor, a source of modulating signals connected between said base electrodes, a source of carrier oscillations, means for deriving an output signal connected in series circuit arrangement with said source of carrier oscillations, and means for coupling said collector electrodes comprising said series circuit arrangement.

4. A modulator circuit arrangement comprising a first pair of transistors, each having an emitter electrode, a collector electrode, a base electrode, an emitter-collector path and a collector-base path, means for connecting the emitter-collector path of one of said transistors in series with the collector-base path of the other of said transistors, means for connecting the collector-base path of said one transistor in series with the emitter-collector path of said other transistor, a second pair of transistors, each having an emitter electrode, a collector electrode, a base electrode, an emitter-collector path and a collector-base path, means for connecting the emitter-collector path of one of said second pair of transistors in series with the collector-base path of the other of said second pair of transistors, means for connecting the collector-base path of said one of said second pair of transistors in series with the emitter-collector path of said other of said second pair of transistors, a first signal source connected between the emitter and base electrodes of each of said first pair of transistors and the emitter and base electrodes of each of said second pair of transistors, means for connecting the collector electrode of one of said first pair of transistors to the collector electrode of the other of said second pair of transistors, means for connecting the collector electrode of the other of said first pair of transistors to the collector electrode of the one of said second pair of transistors, a second signal source, means for deriving an output signal connected in series circuit arrangement with said second signal source, and means for connecting said series circuit arrangement between said collector electrode connecting means.

5. A modulator circuit arrangement comprising a first transistor and a second transistor, each having an emitter electrode, a collector electrode and a base electrode, a first junction point, means for connecting the emitter electrode of said first transistor to said first junction point, means for connecting the base electrode of said second transistor to said first junction point, a second junction point, means for connecting the emitter electrode of said second transistor to said second junction point, means for connecting the base electrode of said first transistor to said second junction point, a first signal source connected between said first and second junction points, a second signal source, means for deriving an output signal connected in series circuit arrangement with said second signal source, and means for coupling the collector electrode of said first transistor to the collector electrode of said second transistor comprising said series circuit arrangement.

6. A modulator circuit arrangement comprising a first transistor, a second transistor, a third transistor and a fourth transistor, each having an emitter electrode, a collector electrode and a base electrode, a first junction point, means for connecting the emitter electrode of said first transistor to said first junction point, means for connecting the base electrode of said second transistor to said first junction point, a second junction point, means for connecting the emitter electrode of said second transistor to said second junction point, means for connecting the base electrode of said first transistor to said first junction point, a third junction point, means for connecting the emitter electrode of said third transistor to said third junction point, means for connecting the base electrode of said fourth transistor to said third junction point, a fourth junction point, means for connecting the emitter electrode of said fourth transistor to said fourth junction point, means for connecting the base electrode of said third transistor to said fourth junction point, a fifth junction point connected to said first and third junction points, a sixth junction point connected to said second and fourth junction points, a first signal source connected between said fifth and sixth junction points, means for connecting the collector electrode of said first transistor to the collector electrode of said fourth transistor, means for connecting the collector electrode of said second transistor to the collector electrode of said third transistor, a second signal source, means for deriving an output signal connected in series circuit arrangement with said second signal source, and means for connecting said series circuit arrangement between said collector electrode connecting means.

7. A modulator circuit arrangement comprising a pair of transistors each having an emitter electrode forming an input electrode system with a base electrode, a collector electrode, an emitter-collector path and a collector-base path, means connecting the emitter-collector path of each of said transistors in series with the collector-base path of the other of said transistors, a first signal source connected in the input electrode systems of said transistors, a second signal source, means for deriving an output signal from said circuit arrangement, and means connecting said first-mentioned means in series circuit arrangement with said second signal source between the collector electrodes of said transistors.

8. A modulator circuit arrangement comprising a pair of transistors each having emitter, collector and base electrodes, an emitter-collector path, an emitter-base path and a collector-base path, means connecting the emitter-collector path of each of said transistors in series with the collector-base path of the other of said transistors, a first signal source, means connecting said first signal source in series with the emitter-base path of each of said transistors, a second signal source, means for deriving an output signal from said circuit arrangement, and means connecting said last-mentioned means in series circuit arrangement with said second signal source between the collector electrodes of said transistors.

9. A modulator circuit arrangement comprising two pairs of transistors each having emitter, collector and base electrodes, an emitter-collector path, an emitter-base path and a collector-base path, means connecting the emitter-collector path of each of the transistors of each pair of transistors in series with the collector-base path of the other of the transistors of each pair of transistors, a first signal source, means connecting said first signal source in series with the emitter-base path of each of said transistors, a second signal source, means for deriving an output signal from said circuit arrangement, and means connecting said last-mentioned means in series circuit arrangement with said second signal source in common between the collector electrodes of the transistors of each pair of transistors.

References Cited in the file of this patent

UNITED STATES PATENTS

| | | |
|---|---|---|
| 2,707,752 | Gabler | May 3, 1955 |
| 2,713,665 | Raisbeck et al. | July 19, 1955 |